United States Patent
Kobayashi et al.

(10) Patent No.: US 9,943,919 B2
(45) Date of Patent: Apr. 17, 2018

(54) ELECTROCHEMICAL MACHINING APPARATUS

(71) Applicant: MITSUBISHI HEAVY INDUSTRIES, LTD., Tokyo (JP)

(72) Inventors: Tetsuhei Kobayashi, Tokyo (JP); Shin Asano, Tokyo (JP); Kazuhisa Tamura, Tokyo (JP); Yosuke Mukai, Tokyo (JP); Tomofumi Shintani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 427 days.

(21) Appl. No.: 14/432,287

(22) PCT Filed: Oct. 9, 2013

(86) PCT No.: PCT/JP2013/077462
§ 371 (c)(1),
(2) Date: Mar. 30, 2015

(87) PCT Pub. No.: WO2014/057970
PCT Pub. Date: Apr. 17, 2014

(65) Prior Publication Data
US 2015/0251262 A1    Sep. 10, 2015

(30) Foreign Application Priority Data
Oct. 10, 2012   (JP) .................... 2012-224973

(51) Int. Cl.
*B23H 7/38* (2006.01)
*B23H 7/28* (2006.01)
(Continued)

(52) U.S. Cl.
CPC ............. *B23H 7/38* (2013.01); *B23H 3/02* (2013.01); *B23H 7/28* (2013.01); *B23H 7/32* (2013.01);
(Continued)

(58) Field of Classification Search
CPC ... B23H 3/02; B23H 7/28; B23H 7/38; B23H 9/14; B23H 9/16
See application file for complete search history.

(56) References Cited

U.S. PATENT DOCUMENTS

2009/0120912 A1*  5/2009  Schoepf ............... B23H 7/10
                                                    219/69.17

FOREIGN PATENT DOCUMENTS

| CN | 1575898 | 2/2005 |
| CN | 101155658 | 4/2008 |

(Continued)

OTHER PUBLICATIONS

International Search Report dated Nov. 19, 2013 in International Application No. PCT/JP2013/077462 (with English translation).

(Continued)

*Primary Examiner* — Nicholas A Smith
(74) *Attorney, Agent, or Firm* — Wenderoth, Lind & Ponack, L.L.P.

(57) ABSTRACT

Provided is an electrochemical machining apparatus, which includes an electrode (3) that form of a shape which a tube shape is extended, including a flexible conductive material, and is which an electrolyte (W) circulates from a base end side (3b) thereof toward a distal end side (3a) thereof, a current supply unit (6) that causes electric current to flow with respect to the electrode (3) in an extending direction (direction running the Y direction) in which the electrode (3) extends, and a magnetic field generation unit (7) that includes at least one pair of magnets (9) which are disposed to face the electrodes (3) a direction and apply a magnetic field in a direction (X direction) intersecting the extending direction with respect to the electrodes (3).

10 Claims, 10 Drawing Sheets

(51) Int. Cl.
    *B23H 3/02*     (2006.01)
    *B23H 9/14*     (2006.01)
    *B23H 9/16*     (2006.01)
    *B23H 9/10*     (2006.01)
    *B23H 7/32*     (2006.01)

(52) U.S. Cl.
    CPC ................. *B23H 9/10* (2013.01); *B23H 9/14* (2013.01); *B23H 9/16* (2013.01)

(56) References Cited

FOREIGN PATENT DOCUMENTS

| | | |
|---|---|---|
| CN | 102554376 | 7/2012 |
| JP | 52-30732 | 3/1977 |
| JP | 7-51948 | 2/1995 |
| JP | 2008-522852 | 7/2008 |
| JP | 2011-62811 | 3/2011 |
| JP | 2011-177819 | 9/2011 |
| JP | 2012-35369 | 2/2012 |
| JP | 2012-106320 | 6/2012 |

OTHER PUBLICATIONS

Written Opinion of the International Searching Authority dated Nov. 19, 2013, in International Application No. PCT/JP2013/077462 (with English translation).

First Office Action dated Jan. 7, 2016 in corresponding Chinese Application No. 201380051503.5 (with English translation).

* cited by examiner

ELECTROCHEMICAL MACHINING APPARATUS

TECHNICAL FIELD

This invention relates to an electrochemical machining apparatus that conducts electric current between electrodes and a workpiece via an electrolyte, and thereby dissolves and machines the workpiece.

Priority is claimed on Japanese Patent Application No. 2012-224973, filed on Oct. 10, 2012, the contents of which are incorporated herein by reference.

BACKGROUND ART

The boring of hard-to-cut materials is generally conducted by an electrochemical machining method or an electric discharge machining method. Particularly, when the boring is conducted on the hard-to-cut materials having a high aspect ratio, it is preferable to use the electrochemical machining method.

Incidentally, for example, a cooling hole for circulating a coolant is provided in a turbine blade of a gas turbine to cool the turbine blade. To increase a cooling efficiency based on the cooling hole, the shape of the cooling hole is preferably curved along a geometric shape of the turbine blade. However, the conventional electrochemical machining method for the turbine blade is suitable to form a straight hole, but it is hard to form a machining hole having a curved shape, i.e. a curved hole.

In Patent Literature 1, a curved hole machining apparatus devised to machine a curved hole is disclosed. In the curved hole machining apparatus, a surface of an electrode tool for machining is partly removed and covered with an insulating member, and thereby a difference in a machined amount is given at a circumferential position of the electrode tool for machining. That is, current density generated between the workpiece and the electrode tool for machining is increased at a portion that is not covered with the insulating member, and thereby an electric field is unevenly distributed at the electrode tool for machining. Therefore, the machined amount is increased at the portion at which the current density is increased, and the electrode tool for machining travels to a side at which the machined amount is great. Thereby, the curved hole is formed.

CITATION LIST

Patent Literature

[Patent Literature 1]
Japanese Unexamined Patent Application, First Publication No. H07-51948

SUMMARY OF INVENTION

Technical Problem

However, in the technique described in Patent Literature 1, since a travelling direction is decided according to a difference of the machined amount between the portion of the surface of the electrode tool for machining which is covered with the insulating member and the portion that is not, a direction in which the curved hole is formed cannot be adjusted arbitrarily. That is, since an area of the portion of the surface of the electrode tool for machining which is covered with the insulating member and an area of the portion that is not are each fixed, the difference of the machined amount cannot be adjusted, and the curved hole having a desired shape is not easy to form. Further, in the technique described in Patent Literature 1, a change in the uneven distribution of the electric field is likely to be generated by degradation resulting from the use of the electrode tool for machining. From this point, it is also difficult to form the curved hole having the desired shape.

An object of this invention is to provide an electrochemical machining apparatus capable of easily forming a curved hole having a desired shape.

Solution to Problem

According to a first aspect of this invention, there is provided an electrochemical machining apparatus which includes an electrode configured to form of a shape which a tube shape is extended, including a flexible conductive material, and in which an electrolyte circulates from a base end side thereof toward a distal end side thereof, a current supply unit configured to cause electric current to flow to the electrode in an extending direction in which the electrode extends, and a magnetic field generation unit configured to apply a magnetic field with respect to the electrode in a direction intersecting the extending direction.

According to the electrochemical machining apparatus, the machining hole is formed while a workpiece is dissolved by electric current conducted between an electrode and the workpiece via an electrolyte flowing out of a distal end of the electrode. In this case, a magnetic field is applied to the electrode by the magnetic field generation unit and a Lorentz force acts on the charged particles in electric current flowing through the electrode. As a result, the electrode is bent in a direction in which the magnetic force is applied and the electric current flows, and the machining hole is formed as a curved hole. Thus, a bending direction can be adjusted in the intensity of the magnetic force and the direction of the applied magnetic force.

Furthermore, the magnetic field generation unit may include at least one pair of magnets disposed to face each other.

When the magnetic field is reliably applied to the direction intersection the extending direction of the electrode by the magnetic field generation unit, the electrode can be bent to easily form the machining hole into a curved hole having a desired shape.

According to a second aspect of the present invention, the electrochemical machining apparatus may further include a first movement mechanism configured to move the magnetic field generation unit in a direction intersecting facing directions of the pair of magnets.

Due to the first movement mechanism, the magnetic field generation unit can be moved to a position corresponding to a position of the electrode so as to reliably apply the magnetic force to the electrode. As such, the electrode can be reliably bent to form the machining hole into the curved hole having a desired shape with ease.

According to a third aspect of the present invention, the electrochemical machining apparatus may further include a rotating mechanism configured to move the magnetic field generation unit to be rotated about an axis extending in a direction intersecting facing directions of the pair of magnets.

Due to this rotating mechanism, a surface of the workpiece in which the curved hole is formed has a curved shape and thus a three-dimensional shape. As such, even when the curved hole itself needs to be formed in the three-dimensional shape, a direction of the magnetic field generation unit can be adjusted to bend the electrode in line with the shape of a target shape of the curved hole. Therefore, the magnetic field is applied to the electrode, and the curved hole having a desired shape can be easily formed.

According to a fourth aspect of the present invention, the electrochemical machining apparatus may further include a support member configured to support the pair of magnets in the magnetic field generation unit and includes a ring guide formed in an annular shape about the axis and may be moved and rotated by the first movement mechanism and the rotating mechanism.

In this way, the pair of magnets are supported by the annular ring guide. Thereby, even when the curved hole needs to be three-dimensionally formed, a direction of the magnetic field generation unit can be adjusted by the first movement mechanism and the rotating mechanism so as to bend the electrode in line with a target shape of the curved hole. Therefore, the magnetic field is reliably applied to the electrode, and the curved hole having a desired shape can be easily formed.

Further, the magnetic field generation unit may be configured such that the plurality of pairs of magnets which are disposed to interpose the electrode are arranged in an annular shape so as to surround the electrode, and the pair of magnets may be electrodes. The magnetic field generation unit may further include a magnetic field controller that controls magnitude of the magnetic field generated by each pair of magnets.

In this way, the plurality of pairs of electromagnets are disposed in the annular shape, and further the magnitude of the magnetic field can be controlled over each pair of electromagnets by the magnetic field controller. That is, any pair of electrodes is selected to generate the magnetic field, and thereby the direction in which the magnetic field is applied to the electrode can be continuously adjusted. Accordingly, even when the curved hole needs to be three-dimensionally formed, the magnetic field is reliably applied to the electrode in line with the target shape of the curved hole, and the curved hole having the desired shape can be easily formed.

According to a fifth aspect of the present invention, the electrochemical machining apparatus may further include a second movement mechanism configured to move toward and away from the pair of magnets of the magnetic field generation unit each other.

Due to this second movement mechanism, the distance between the magnets is adjusted, thereby making it possible to adjust intensity of the magnetic field, to obtain a Lorentz force having a desired magnitude, and to bend the electrode to easily form the curved hole having the desired shape.

Further, the electrochemical machining apparatus may further include a current controller configured to control a magnitude of the electric current flowed by the current supply unit to the electrode.

Due to this current controller, a magnitude of the Lorentz force acting on the charged particles in the electric current flowing to the electrode can be adjusted, and the electrode can be bent to easily form the curved hole having the desired shape.

Further, a plurality of the electrodes may be disposed at intervals in a direction intersecting the extending direction of the electrode, and the magnetic field generation units are disposed so as to apply the magnetic field at different positions in the extending direction with respect to each of the plurality of electrodes.

In this way, since the magnetic field is applied to each of the plurality of electrodes at different positions by the magnetic field generation units, the magnetic field does not applied from the magnetic field generation units applying the magnetic field to the other electrodes. That is, the electrodes can be independently bent at the same time. Therefore, the plurality of curved holes having a desired shape can be formed at the same time.

According to a sixth aspect of the present invention, the electrochemical machining apparatus may further include a detecting unit configured to detect a position of the electrode, and a position displacement controller configured to calculate a difference between the position of the electrode detected by the detecting unit and a predetermined target machining position, and to adjust magnitude of the magnetic field so as to reduce the calculated difference.

Due to this position displacement controller, feedback control can be performed such that a machining position of the curved hole is similar to a target machining position. For this reason, the curved hole having a desired shape can be formed in a more reliable way.

According to a seventh aspect of the present invention, the electrochemical machining apparatus may further include a deflection amount educing mechanism, the deflection amount reducing mechanism includes auxiliary magnetic field generation units configured to apply the magnetic field in a direction intersecting the extending direction with respect to the electrode and a deflection amount controller configured to calculate a deflection amount of the electrode and to adjust magnitude of the magnetic field applied by the auxiliary magnetic field generation units so as to reduce the calculated deflection amount.

When the curved hole is machined in the workpiece while the electrode moves toward the distal end side, deflection may occur in the curved hole, and thereby smooth machinability may be obstructed. Here, to reduce the deflection occurring at the electrode, the magnitude of the magnetic field applied to the auxiliary magnetic field generation units by the deflection amount reducing mechanism, i.e. the Lorentz force acting on the charged particles in the electric current, is adjusted. Thus, it is possible to bend the electrode and to easily machine the curved hole.

According to a seventh aspect of the present invention, the electrochemical machining apparatus may further include a deflection amount reducing mechanism, the deflection amount reducing mechanism includes an auxiliary magnetic field generation unit configured to apply the magnetic field in a direction intersecting the extending direction with respect to the electrode and a reciprocating mechanism configured to cause the auxiliary magnetic field generation unit to reciprocate in the extending direction of the electrodes.

Due to this auxiliary magnetic field generation unit, when the deflection occurs when the curved hole is machined in the workpiece while the electrode moves to the distal end side, the magnetic field is applied while the auxiliary magnetic field generation unit is reciprocated in the extending direction of the electrode by the reciprocating mechanism. Thereby, the electrode can be bent. Therefore, it is possible to cause the deflection occurring at the electrode to be pulled and reduced, and to more easily machine the curved hole.

Advantageous Effects of Invention

According to the aforementioned electrochemical machining apparatus, it is possible to bend the electrode using the Lorentz force acting on the charged particles in the electric current using the magnetic field generation unit, and to easily form the curved hole having a desired shape.

DESCRIPTION OF EMBODIMENTS

First Embodiment

Hereinafter, an electrochemical machining apparatus 1 according to a first embodiment of this invention will be described.

The electrochemical machining apparatus 1 is an apparatus for forming machining holes 101 into curved holes with respect to a workpiece 100. In the present embodiment, the workpiece 100 is a turbine blade of a gas turbine, and the machining holes 101 of the workpiece 100 become cooling holes for cooling the turbine blade.

Figure 1:
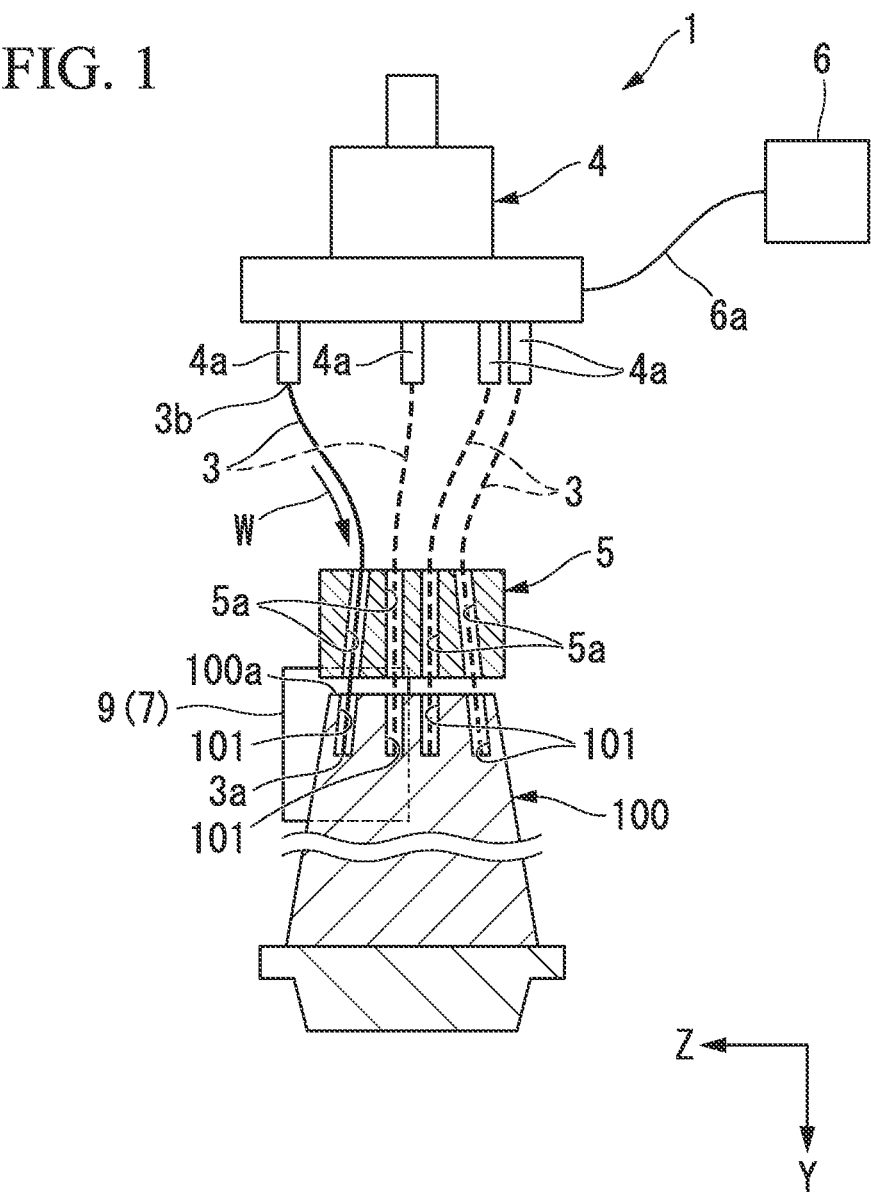
FIG. 1 is a front view showing an electrochemical machining apparatus according to a first embodiment of the present invention.

As shown in FIG. 1, the electrochemical machining apparatus 1 includes electrodes 3 forming the machining holes 101 in the workpiece 100, a current supply unit 6 supplying electric current to the electrodes 3, a magnetic field generation unit 7 applying a magnetic field to the electrodes 3, a movement mechanism 4 advancing or retracting the electrodes 3, and a guide unit 5 guiding the electrodes 3 when the electrodes 3 are advanced or retracted. Further, the electrochemical machining apparatus 1 includes a support member 8 supporting the magnetic field generation unit 7, and a support shaft movement mechanism (first movement mechanism) 14 and a support arm movement mechanism (first movement mechanism) 15, both of which move the support member 8.

The movement mechanism 4 advances or retracts the electrodes 3 with respect to the workpiece 100. In the present embodiment, the movement mechanism 4 is disposed at the side of a distal end 100a of the turbine blade that is the workpiece 100, and is configured to be able to be advanced or retracted with respect to the distal end 100a.

Furthermore, the movement mechanism 4 performs reciprocation of the electrodes 3, for instance, using a driving source such as an electric motor (not shown). Acceleration of the reciprocation of the movement mechanism 4, i.e., output of the driving source, is controlled by a pushing-in force controller (not shown). Thereby when the movement mechanism 4 advances or retracts the electrodes 3, i.e., pushes the electrodes into the machining holes 101, a pushing-in force can be arbitrarily adjusted.

Further, the movement mechanism 4 has a plurality of grippers 4a, which grip base ends 3b of the electrodes 3, on its surface at the side of the workpiece 100. The grippers 4a are each shaped of a tube whose interior has a hollow shape. The base end 3b of each of the electrodes 3 is inserted into one end side of the gripper 4a, and thereby the gripper 4a can grip the electrode 3. Further, the other end side of each of the grippers 4a is connected to an electrolyte flow passage (not shown). An electrolyte W is supplied into the grippers 4a via the electrolyte flow passage. A supplied quantity of the electrolyte W can be arbitrarily adjusted by a flow rate controller (not shown). As the electrolyte W, for example, sulfuric acid, nitric acid, a saline solution, etc. are used.

The guide unit 5 is disposed between the movement mechanism 4 and the distal end 100a of the workpiece 100 (a distal end shroud of the turbine blade). The guide unit 5 guides the electrodes advanced or retracted by the movement mechanism 4 in a predetermined travelling direction with respect to the distal end 100a of the workpiece 100. A plurality of guide holes 5a that mutually communicate with the side of the movement mechanism 4 and the side of the workpiece 100 are drilled in the guide unit 5. Each of the plurality of electrodes 3 is inserted into these guide holes 5a from the side of the movement mechanism 4 toward the side of the workpiece 100. Thus, in this state, these electrodes 3 are moved by the movement mechanism 4. Thereby, depending on the disposition of the guide holes 5a, the electrodes 3 can be introduced at desired positions of the distal end 100a of the workpiece 100 and at desired angles with respect to the distal end 100a.

The electrodes 3 form the machining holes 101 (cooling holes of the turbine blade) in the workpiece 100 by electrochemical machining. Each electrode 3 is shaped of a tube extending along an axis, and is formed of a flexible conductive material such as stainless steel, copper, titanium, or the like. An inner circumferential hollow portion of the electrode 3 (or an interior of the electrode 3) communicates with a hollow portion of the gripper 4a of the movement mechanism 4. Thereby, the electrolyte W provided for the electrochemical machining is circulated in the interior of the electrode 3 from the side of the base end 3b (or the side of the movement mechanism 4) toward the side of a distal end 3a (or the side of the workpiece 100). In the present embodiment, the electrode 3 is shaped of a cylinder (see FIG. 3), but it may be shaped of, for instance, an angular tube having a polygonal cross section.

Further, an outer circumferential surface of the electrode 3 is coated with an insulation layer (not shown) formed of, for instance, a polyester resin having electric insulation. The electrode 3 is exposed at an end face of the side of the distal end 3a thereof, and the electric current can be conducted between the electrode 3 and the workpiece 100 by the exposed portion of the distal end 3a.

The current supply unit 6 is a power supply that is connected to the electrodes 3 by a cable 6a and supplies electric current to the electrodes 3 to cause the electric current to flow from the base ends 3b toward the distal ends 3a of the electrodes 3.

Next, the magnetic field generation unit 7 and the support member 8 supporting the magnetic field generation unit 7 will be described.

Figure 2:
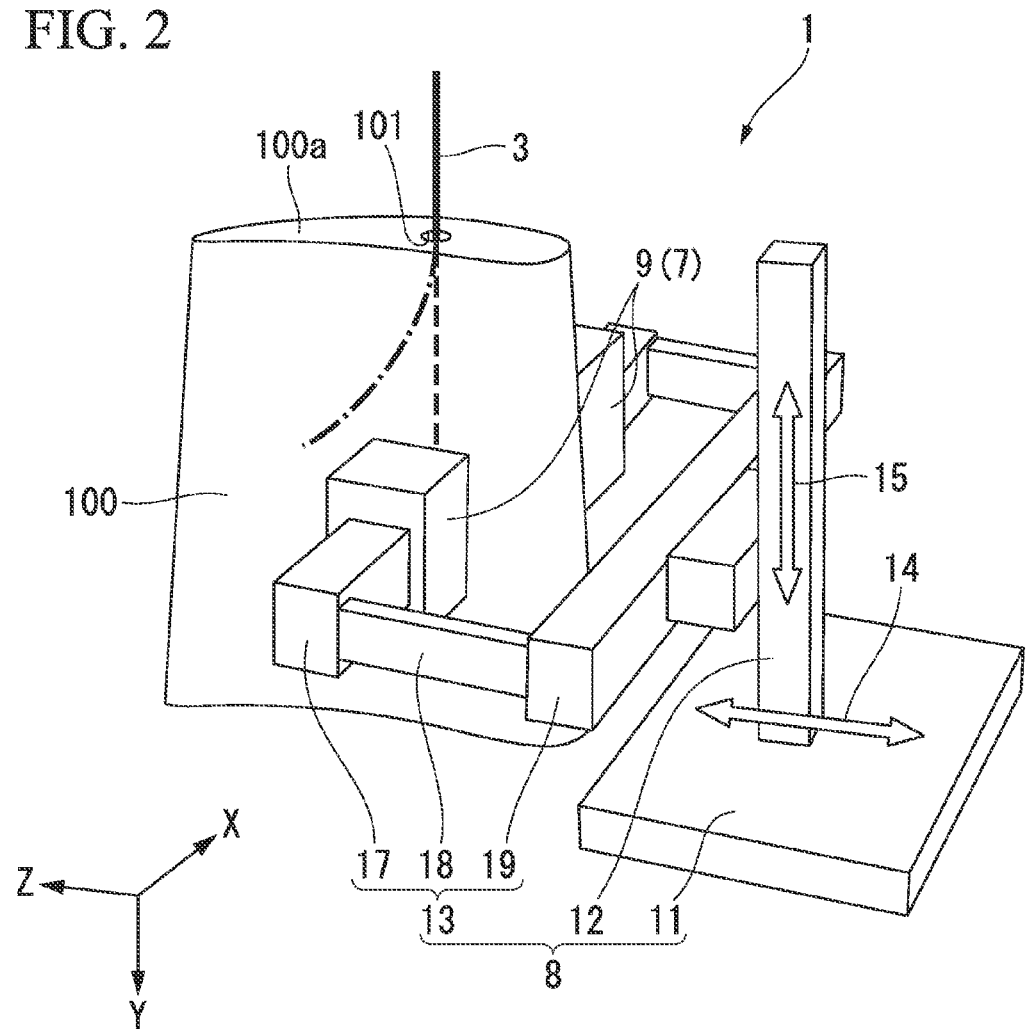
FIG. 2 is a schematic perspective view showing essential parts of the electrochemical machining apparatus according to the first embodiment of the present invention.
Figure 3:
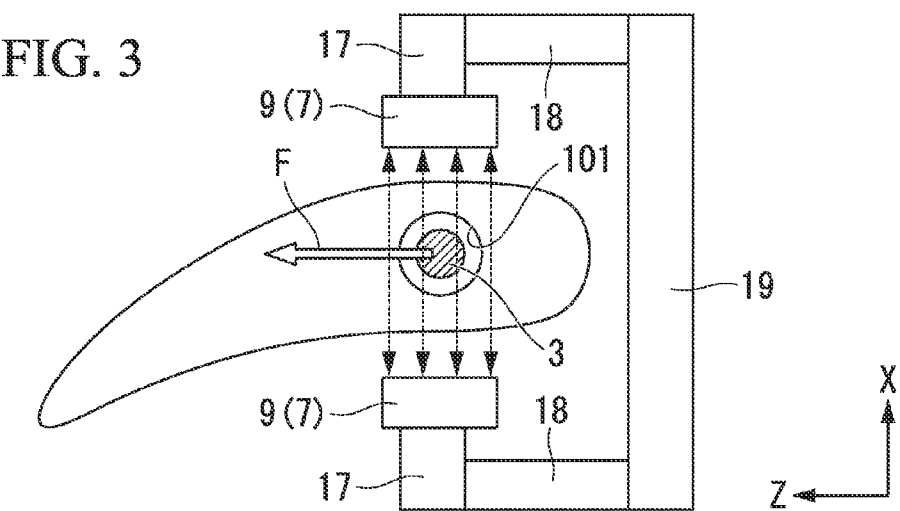
FIG. 3 is a schematic plan view showing essential parts of the electrochemical machining apparatus according to the first embodiment of the present invention.

As shown in FIGS. 2 and 3, the magnetic field generation unit 7 applies a magnetic held to the electrode 3 in a direction that intersects an extending direction of the electrode 3. Further, the magnetic field generation unit 7 has the electrode 3 and a pair of magnets 9 disposed to be opposite to each other so as to interpose the workpiece 100 into which the electrode 3 is inserted. The magnets 9 may be electromagnets or permanent magnets. Further, in the present embodiment, the pair of magnets 9 are disposed at the distal end 3a of the electrode 3.

Here, a direction in which the pair of magnets 9 are opposite to each other is defined as an X direction, a direction which is perpendicular to the X direction and runs in a direction in which the electrode 3 extends is defined as a Y direction, and a direction that is perpendicular to the X and Y directions is defined as a Z direction.

The support member 8 has a stage 11 disposed at one side (lower side of the space of FIG. 2) in the Y direction, a support shaft 12 extending from the stage 11 to the other side in the Y direction, and a support arm 13 that is mounted on the support shaft 12, extends to one side (left side of the space of FIG. 2) in the Z direction, and supports the magnetic field generation unit 7.

The stage 11 is a base that supports the magnetic field generation unit 7 via the support shaft 12 and the support arm 13 at one side in the Y direction.

The support shaft 12 is shaped of a rod, is provided to be movable on the stage 11 in the Z direction, and supports the support arm 13 at one side in the Z direction.

The support arm 13 has a pair of magnet supports 17 on which the pair of magnets 9 are mounted and that extend in the X direction so as to be mutually separated from the pair of magnets 9, a pair of arms 18 that extend from ends of each of the magnet supports 17 toward the other side in the Z direction, and an arm connector 19 that connects ends of the pair of arms 18 in the X direction at the other side in the Z direction. The support arm 13 is shaped of a frame when viewed in the Y direction.

A support shaft movement mechanism 14 is provided for the stage 11, and allows the support shaft 12 to move in the Z direction. Further, although details of the support shaft movement mechanism 14 are not shown, the support shall movement mechanism 14 moves the support shaft 12 using, for instance, a motor or an actuator.

A support arm movement mechanism 15 is provided for the support shaft 12, and allows the support arm 13 to move in the Y direction. Further, although details of the support arm movement mechanism 15 are not shown, the support arm movement mechanism 15 moves the support arm 13 using, for instance, a motor or an actuator.

In this electrochemical machining apparatus 1, the electrolyte W flows out of the distal end 3a of the electrode 3, the electric current is conducted between the electrode 3 and the workpiece 100 via the electrolyte W, and the machining holes 101 are formed in the workpiece 100 while the workpiece 100 is dissolved. In this case, the magnetic field is applied to the electrode 3 in the X direction by the magnetic field generation unit 7, a Lorentz force F acts on charged particles in the electric current flowing to the electrode 3, and the electrode 3 is bent in the Z direction (see a dot and dash line of FIG. 2).

Thus, in the present embodiment, the force acts in the direction separated from the support shaft 12 that is one side in the Z direction, and the electrode 3 is bent in this direction. Thereby, the curved hole acting as the machining hole 101 can be formed in the workpiece 100.

Further, both intensity of the magnetic field and the direction in which the magnetic field is applied are adjusted. Thereby it is possible to adjust bending strength and a bending direction of the electrode 3.

Further, the magnetic field generation unit 7 has the pair of magnets 9. Since the pair of magnets 9 are disposed to be opposite to each other with the electrode 3 interposed therebetween, the magnetic field can be reliably applied in the direction intersecting the extending direction of the electrode 3, i.e., in the X direction, and the electrode 3 can be bent to easily form the machining hole 101 as the desired curved hole.

Further, the magnetic field generation unit 7 can be moved to the position corresponding to the position of the electrode 3 such that the magnetic field is reliably applied to the electrode 3 by the support shaft movement mechanism 14 and the support arm movement mechanism 15. For this reason, the electrode 3 can be more reliably bent.

According to the electrochemical machining apparatus 1 of the present embodiment, it is possible to bend the electrode 3 using the Lorentz force F applied to the charged particles by the magnetic field generation unit 7, and to easily form the curved hole having the desired shape and acting as the machining hole 101 in the workpiece 100.

The magnetic field generation unit 7 may not have the pair of magnets 9. For example, the magnetic field generation unit 7 may have one magnet 9.

Further, the support shaft movement mechanism 14 and the support arm movement mechanism 15 may not necessarily be provided.

Second Embodiment

Next, an electrochemical machining apparatus 21 according to a second embodiment of the present invention will be described.

Note that the same components as in the first embodiment will be given the same numerals or symbols, and detailed description thereof will be omitted.

Further, the present embodiment is different from the first embodiment in that the electrochemical machining apparatus 21 further includes a magnet movement mechanism (second movement mechanism) 23 capable of adjusting positions of a pair of magnets 9 in a magnetic field generation unit 7.

Figure 4:
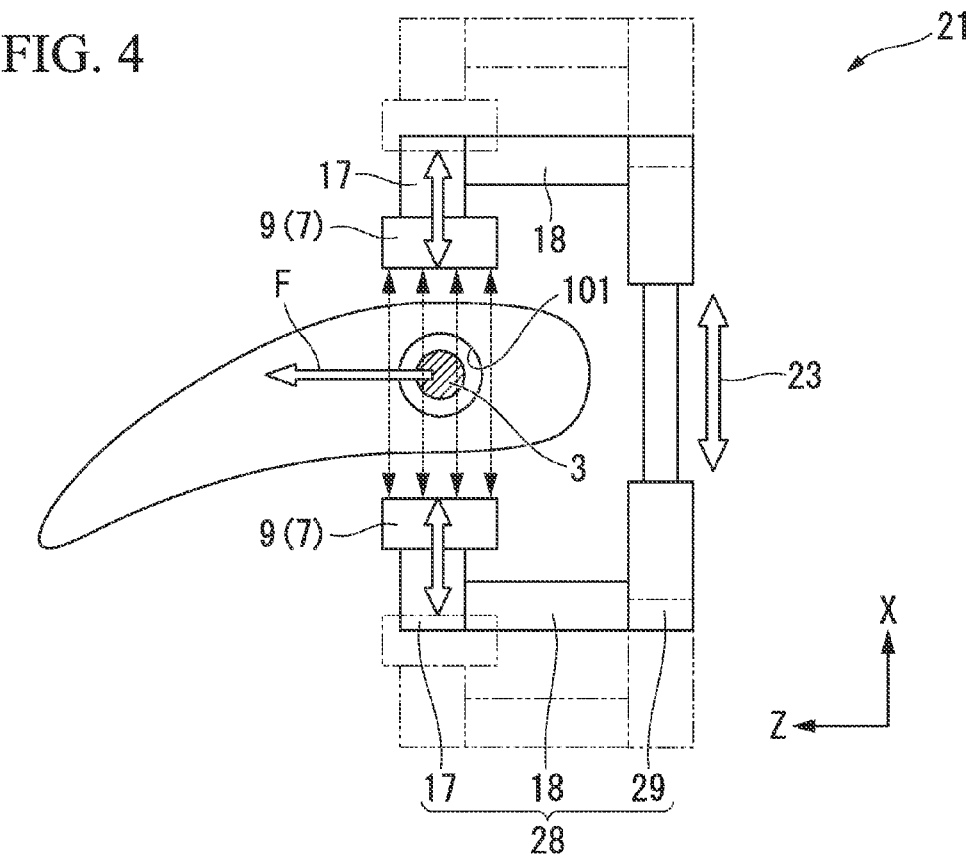
FIG. 4 is a schematic plan view showing essential parts of an electrochemical machining apparatus according to a second embodiment of the present invention.

As shown in FIG. 4 the magnet movement mechanism 23 is provided for an arm connector 19 at a support member 28, and allows the arm connector 29 to expand or contract in an X direction. Although details of the magnet movement mechanism 23 are not shown, the magnet movement mechanism 23 has, for instance, a motor or an actuator and expands or contracts the arm connector 29, thereby causing the pair of magnets 9 to move toward or away from each other in the X direction.

According to this electrochemical machining apparatus 21, the pair of magnets 9 are caused to move toward each other by the magnet movement mechanism 23, and thereby a distance from the electrode 3 disposed between the pair of magnets 9 is reduced.

Here, a Lorentz force F acting on charged particles in electric current of the electrode 3 is proportional to a magnitude of an applied magnetic field. Accordingly, if the distance between the magnet 9 and the electrode 3 is reduced, the magnetic field is strengthened, and thus the Lorentz force F is increased to exert a stronger force on the electrode 3. Thereby, a degree of bending of the electrode 3 can be increased.

On the other hand, the pair of magnets 9 are separated from each other by the magnet movement mechanism 23. The distance between each of the pair of magnets 9 and the electrode 3 is increased, and the magnetic field is reduced. Therefore, the Lorentz force F is reduced, and the force acting on the electrode 3 is reduced. The degree of bending of the electrode 3 can be reduced.

Third Embodiment

Next, an electrochemical machining apparatus 31 according to a third embodiment of the present invention will be described.

Note that the same components as in the first and second embodiments will be given the same numerals or symbols, and detailed description thereof will be omitted.

The present embodiment is different from the first embodiment in that the electrochemical machining apparatus 1 of the first embodiment is used as a basic constitution, the Y and Z directions perpendicular to the X direction in which the pair of magnets 9 in the magnetic field generation unit 7 are opposite to each other are used as rotational axes, and a rotating mechanism 33 capable of rotating the pair of magnets 9 is further provided.

Figure 5:
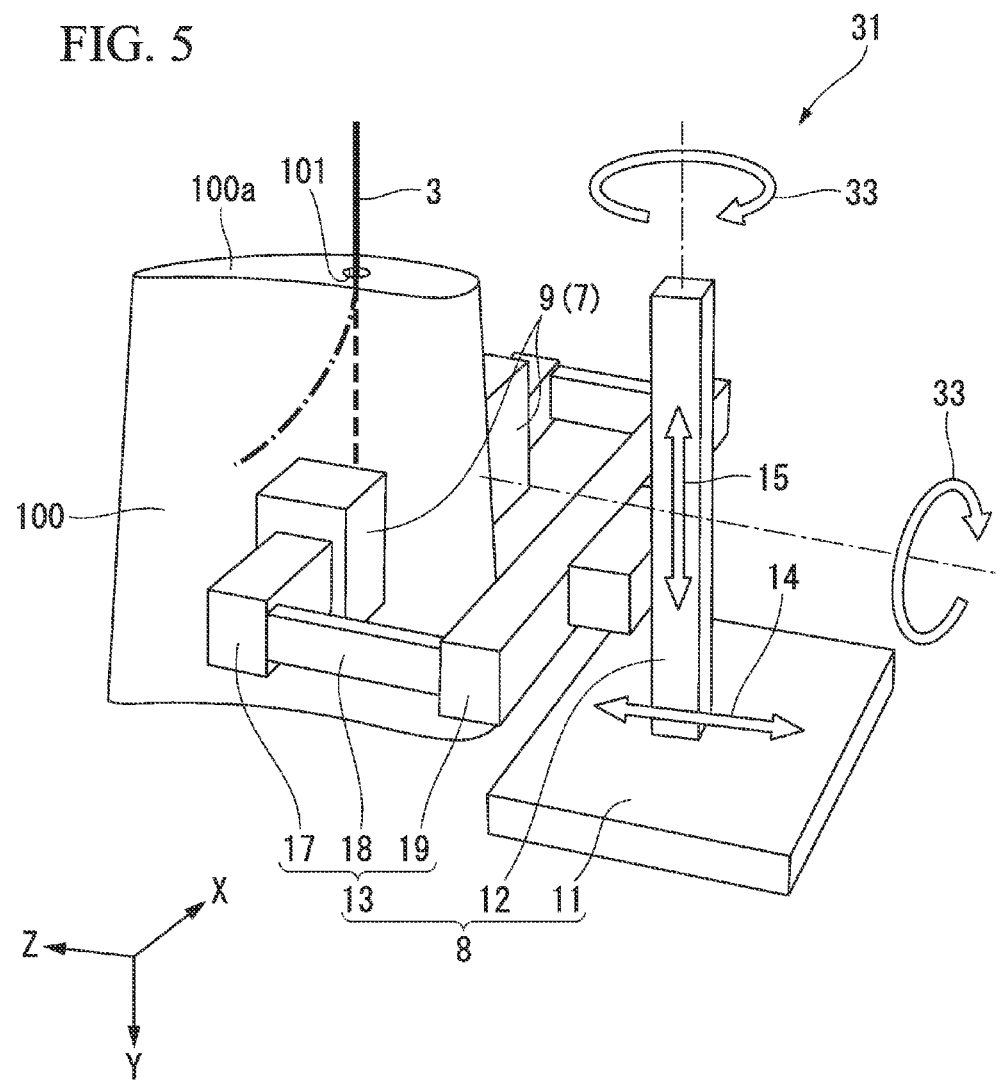
FIG. 5 is a schematic perspective view showing essential parts of an electrochemical machining apparatus according to a third embodiment of the present invention.

As shown in FIG. 5, the rotating mechanism 33 rotates a support shaft 12 in a support member 8, thereby rotating a support arm 13 along with the support shaft 12 using the Y direction as the rotational axis. Further, the rotating mechanism 33 rotates the support arm 13 relative to the support shaft 12 at a mounting portion between the support arm 13 and the support shaft 12 using the Z direction as the rotational axis. Although details of the rotating mechanism 33 are not shown, the pair of magnets 9 are rotated via the support arm 13, for instance, by a motor or an actuator.

According to this electrochemical machining apparatus 31, since a workpiece 100 is a turbine blade, a surface thereof is curved to have a three-dimensional shape. A machining hole 101 itself also needs to be formed into a three-dimensional curved hole. Here, due to the rotating mechanism 33, directions of the pair of magnets 9 can be adjusted in line with movement of an electrode 3 so as to conform with a target shape of the machining hole 101. Thereby, a magnetic field is reliably applied to the electrode 3, and the electrode 3 is bent to allow the machining hole 101 to be formed info the curved hole having a desired three-dimensional shape.

The rotating mechanism 33 of the present embodiment may be applied to the electrochemical machining apparatus 21 of the second embodiment.

Fourth Embodiment

Next, an electrochemical machining apparatus 41 according to a fourth embodiment of the present invention will be described.

Note that the same components as in the first to third embodiments will be given the same numerals or symbols, and detailed description thereof will be omitted.

In the present embodiment, a support member 48 is different from those of the first to third embodiments.

Figure 6:
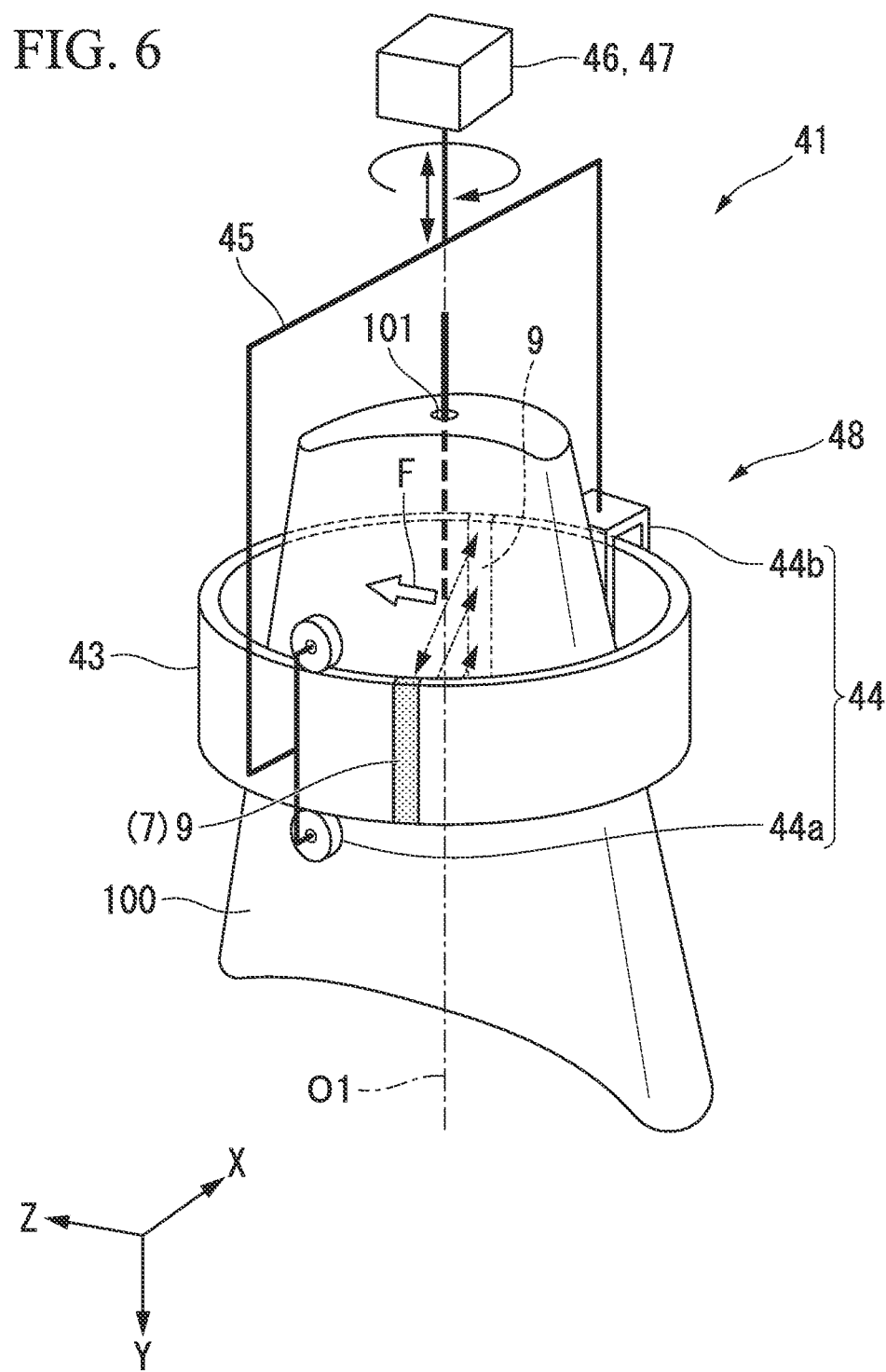
FIG. 6 is a schematic perspective view showing essential parts of an electrochemical machining apparatus according to a fourth embodiment of the present invention.

As shown in FIG. 6, the support member 48 has a ring guide 43 that supports a pair of magnets 9 and has an annular shape centering on an axis O1 extending in a Y direction, a ring guide support 44 guiding the ring guide 43 so as to be rotatable about the axis O1, and a hoisting accessory 45 supporting the ring guide support 44 from another side (or an upper side of the space of FIG. 6) in the Y direction.

The ring guide 43 is shaped of a ring whose center is the axis O1, and supports a pair of magnets 9 by connecting the magnets 9 in the annular shape centering on the axis O1. In other words, the pair of magnets 9 are integrated with the ring guide 43 and one annular member is formed by the ring guide 43 and the magnets 9. Further the ring guide 43 is formed of a non-magnetic material, and does not obstruct a magnetic field that is generated by the magnets 9 and is applied to an electrode 3. Thus, the ring guide 43 and the pair of magnets 9 are held such that they cover the workpiece 100 from an outer circumference of the workpiece 100.

The ring guide support 44 has a pair of guide rollers 44a interposing the ring guide 43 and the pair of magnets 9, which form an annular member as a whole, from opposite sides in the Y direction. The ring guide 43 is supported to be rotatable about the axis O1 by the guide rollers 44a.

Further, the ring guide support 44 is has a holder 44b that is disposed 180° about the axis O1 from positions at which the guide rollers 44a are provided and that surrounds and supports the ring guide 43 from an outer circumference of the ring guide 43.

The hoisting accessory 45 is formed of a wire that is adapted to hang the guide rollers 44a and the holder 44b from above and supports them from one side in the Y direction. Thus, the hoisting accessory 43 is provided with a hoisting accessory movement mechanism (first movement mechanism) 46 that allows the hoisting accessory 45 to move in the Y direction, and a rotating mechanism 47 that allows the hoisting accessory 45 to be rotated about the axis O1. The magnets 9 are displaced between one side and the other side in the Y direction via the hoisting accessory 45, and are also rotated about the axis O1, i.e. about the Y direction.

According to this electrochemical machining apparatus 41, the pair of magnets 9 are supported by the ring guide 43. Thereby, even when a machining hole 101 needs to be formed into a curved hole having a three-dimensional shape, a direction of a magnetic field generation unit 7 can be adjusted in line with a target shape of the curved hole while the magnets 9 are moved in the Y direction by movement of the hoisting accessory movement mechanism 46 and the totaling mechanisms 47.

Accordingly, a magnetic field is reliably applied to the electrode 3 so as to bend the electrode 3, and the curved hole having a desired shape can be easily formed.

Figure 7:
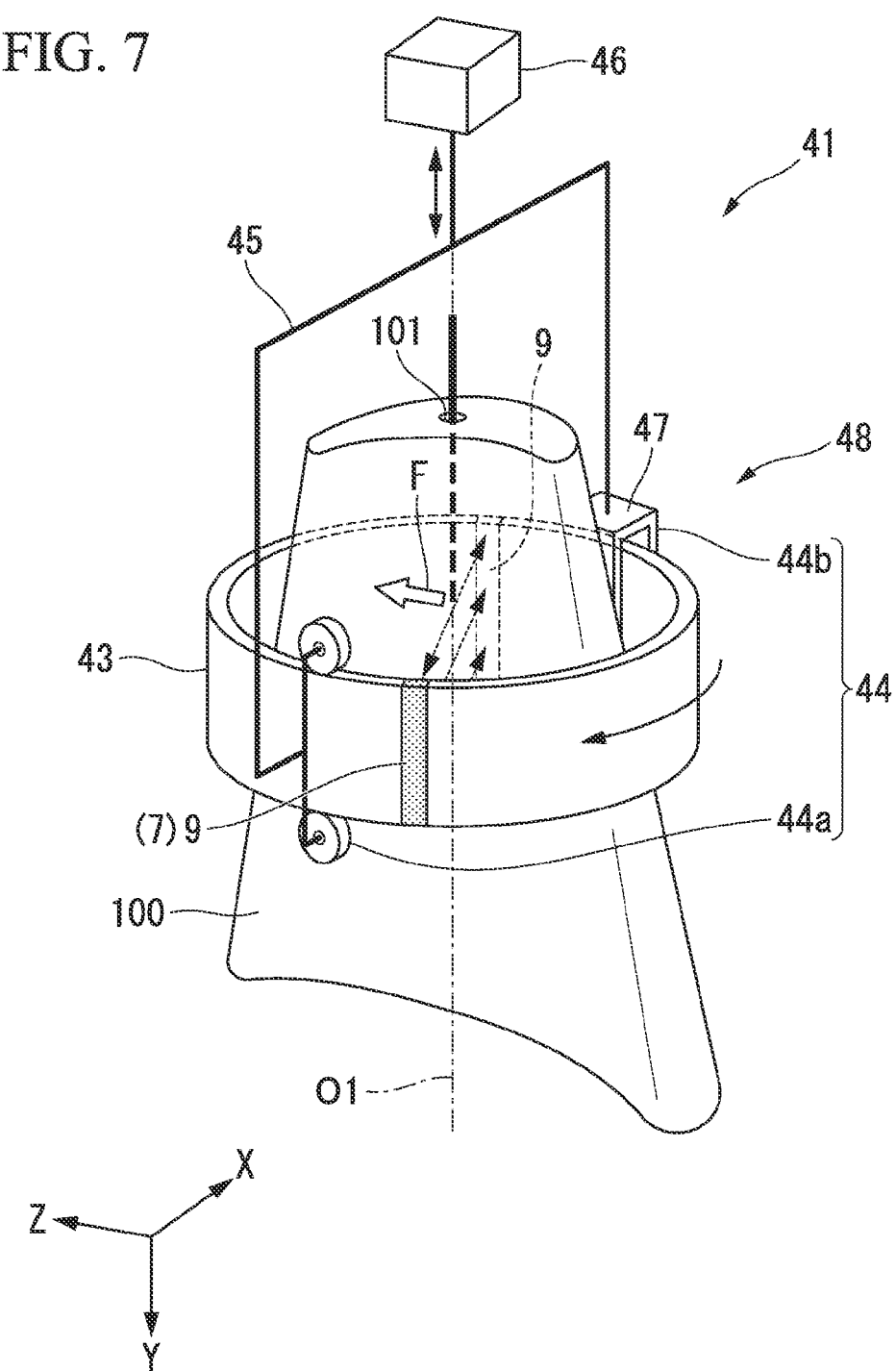
FIG. 7 is a schematic perspective view showing essential parts of an electrochemical machining apparatus according to a modified example of the fourth embodiment of the present invention.

Here, as shown in FIG. 7, the rotating mechanism 47 is provided for the holder 44b of the ring guide support 44 rather than the hoisting accessory 45, and may thereby rotate the ring guide 43 and the magnets 9.

Fifth Embodiment

Next, an electrochemical machining apparatus 51 according to a fifth embodiment of the present invention will be described.

Note that the same components as in the first to fourth embodiments will be given the same numerals or symbols, and detailed description thereof will be omitted.

In the present embodiment, constitutions of a magnetic field generation unit 57 and a support member 58 are different from those of the first to fourth embodiments.

Figure 8:
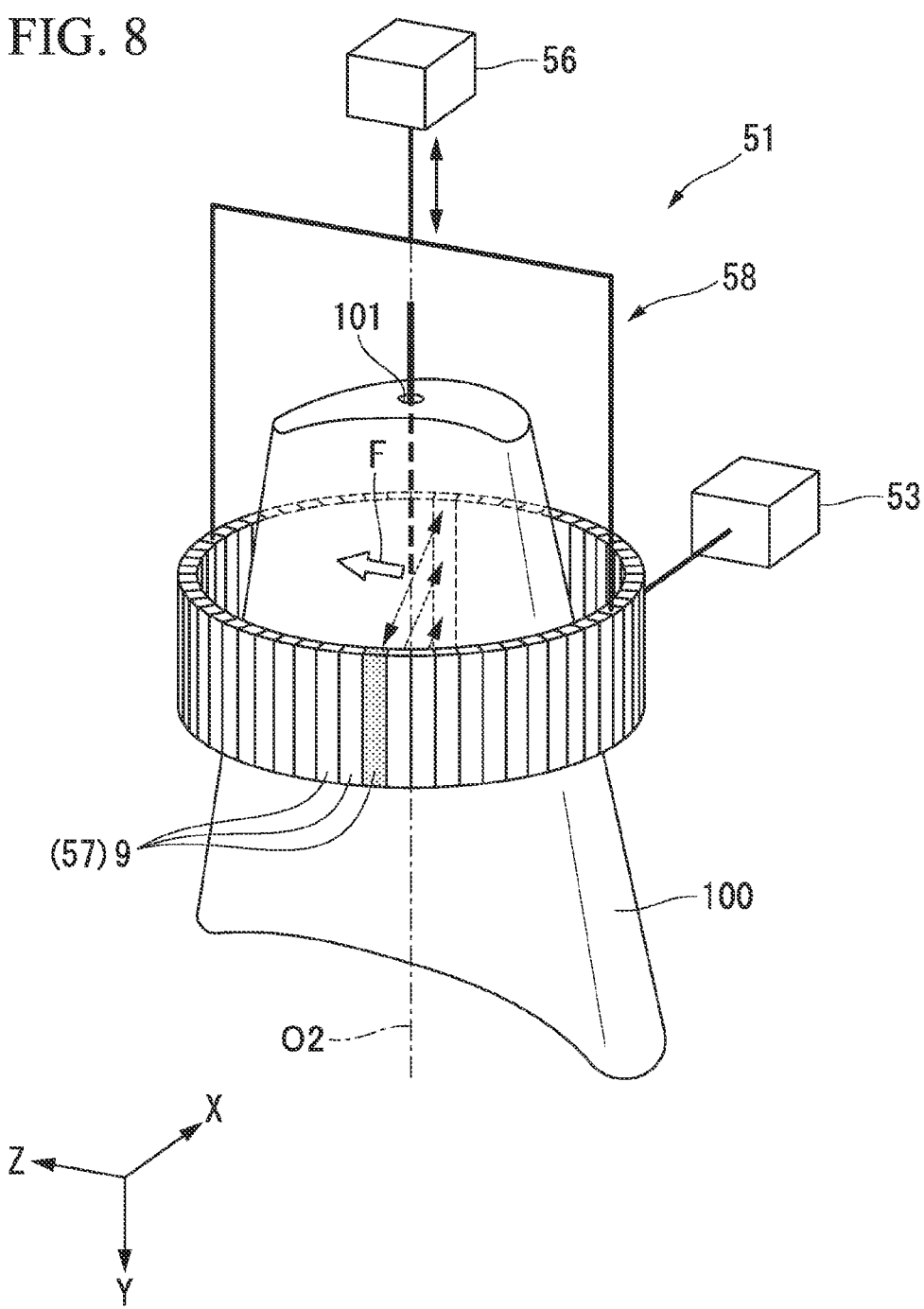
FIG. 8 is a schematic perspective view showing essential parts of an electrochemical machining apparatus according to a fifth embodiment of the present invention.

As shown in FIG. 8, the magnetic field generation unit 57 has a plurality of pairs of magnets 9 disposed to have a shape of a ring whose center is an axis O2 extending in a Y direction, and cover the workpiece 100 from an outer circumference of the workpiece 100. In other words, the plurality of pairs of magnets 9 disposed to interpose an electrode 3 are arranged in an annular shape so as to surround the electrode 3. Further, in the present embodiment, the neighboring magnets 9 are continuously mounted in a circumferential direction. Furthermore, these magnets 9 are electromagnets, and the magnetic field generation unit 57 further includes a magnetic field controller 53 for controlling the magnitude of a magnetic field generated at each pair of magnets 9.

The support member 58 is formed of a wire that is adapted to hang the plurality of magnets 9 disposed in the annular shape and supports the plurality of magnets 9 from one side in the Y direction.

Thus, the support member 58 is provided with a support member movement mechanism (first movement mechanism) 56 dial allows the support member 58 to move in the Y direction and allows the plurality of magnets 9 having the annular shape to move in the Y direction.

The magnetic field controller 53 controls the magnitude of the magnetic field for each pair of magnets 9. To be specific, a voltage or current applied to each pair of magnets 9 is adjusted by a power supply (not shown), and thereby the magnitude of the magnetic field is controlled.

According to this electrochemical machining apparatus 51, the magnitude of the magnetic field can be controlled for each pair of magnets by the magnetic field controller 53. In detail, since any pair of magnets 9 can be selected to generate the magnetic field, a direction in which the magnetic field is applied to the electrode 3 can be continuously adjusted in a circumferential direction of the axis O2 without rotating the magnets 9 about the axis O2. Therefore, even when a machining hole 101 needs to be formed into a curved hole having a three-dimensional shape, a direction of the magnetic field caused by the magnetic field generation unit 57 can be adjusted in line with a target shape of the curved hole while the magnets 9 are displaced in the Y direction by the support member movement mechanism 56.

Therefore, the magnetic field is reliably applied to the electrode 3 so as to bend the electrode 3 in a desired direction, and the curved hole having a desired shape can be easily formed.

In the magnetic field generation units 57, the magnets 9 may be continuously provided, or may be provided at intervals in a circumferential direction of the axis O2. However, in the former case, a direction in which the magnetic field is generated can be smoothly adjusted from a state in which the magnetic field is generated by the pair of magnets 9 such that the magnetic field is generated by the other pairs of magnets 9 adjoining this pair of magnets 9 in a circumferential direction.

Sixth Embodiment

Next, an electrochemical machining apparatus 61 according to a sixth embodiment of the present invention will be described.

Note that the same components as its the first to fifth embodiments will be given the same numerals or symbols, and detailed description thereof will be omitted.

In the present embodiment, the electrochemical machining apparatus 1 of the first embodiment is used as a basic constitution, and a plurality of machining holes 101 are simultaneously machined by a plurality of electrodes 3.

Figure 9:
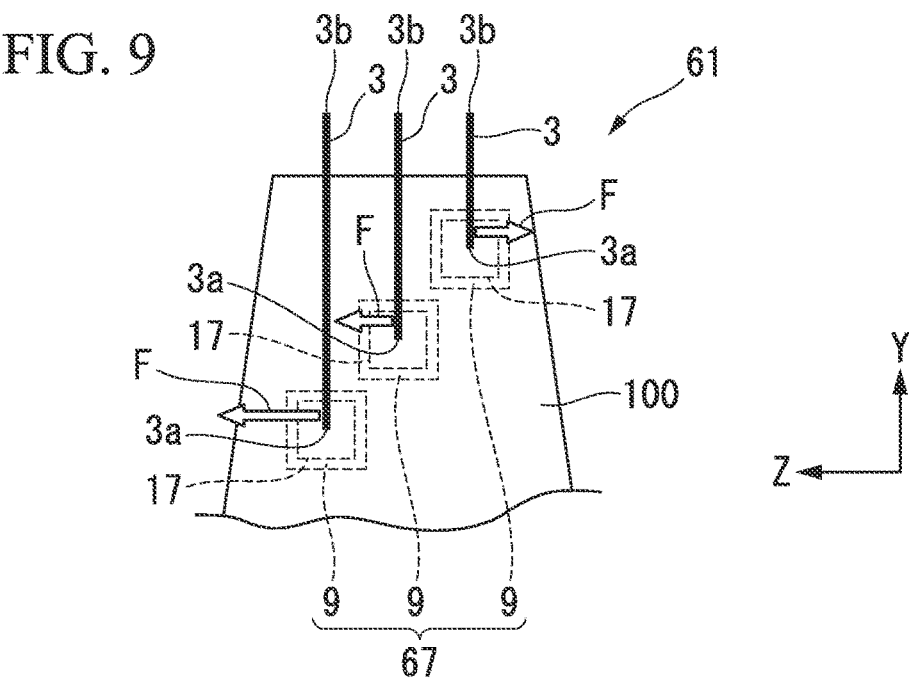
FIG. 9 is a schematic front view showing essential parts of an electrochemical machining apparatus according to a sixth embodiment of the present invention.

As shown in FIG. 9, the electrodes 3 are disposed apart from one another in a Z direction.

The magnetic field generation unit 67 has each of the electrodes 3 and a plurality of magnets 9 (three pairs of magnets 9 in the present embodiment) which are disposed to be opposite to each other so as to interpose the workpiece 100 in which the machining holes 101 are formed and into which each of the electrodes 3 is inserted.

Further, in the present embodiment, in a state in which distal ends 3a of each of the electrodes 3 are disposed at different positions in a Y direction, each of the pairs of magnets 9 is disposed at the distal end 3a of one of the electrodes 3. Thereby, the plurality of pairs (three pairs) of magnets 9 are each disposed at different positions in the Y direction.

According to this electrochemical machining apparatus 61, magnetic fields are applied to each of the plurality of electrodes 3 at different positions in the Y direction by the magnetic field generation unit 67. For this reason, the magnetic field that is generated at the magnets 9 and is applied to one electrode 3 does not act on the other electrodes 3. Namely, the electrodes 3 can be independently bent in a desired shape at the same time. Therefore, it is possible to simultaneously form the plurality of machining holes 101 as curved holes having a desired shape.

Even in the second to fifth embodiments, the machining holes 101 can be simultaneously formed using the plurality of electrodes 3 like the present embodiment.

Seventh Embodiment

Next an electrochemical machining apparatus 71 according to a seventh embodiment of the present invention will be described.

Note that the same components as in the first to sixth embodiments will be given the same numerals or symbols, and detailed description thereof will be omitted.

In the present embodiment, the electrochemical machining apparatus 1 of the first embodiment is used as a basic constitution, and the electrochemical machining apparatus 71 further includes a detecting unit 73 that detects a position of the electrode 3, and a position displacement controller 74 that adjusts a magnitude of a magnetic field based on input from the detecting unit 73.

Figure 10:
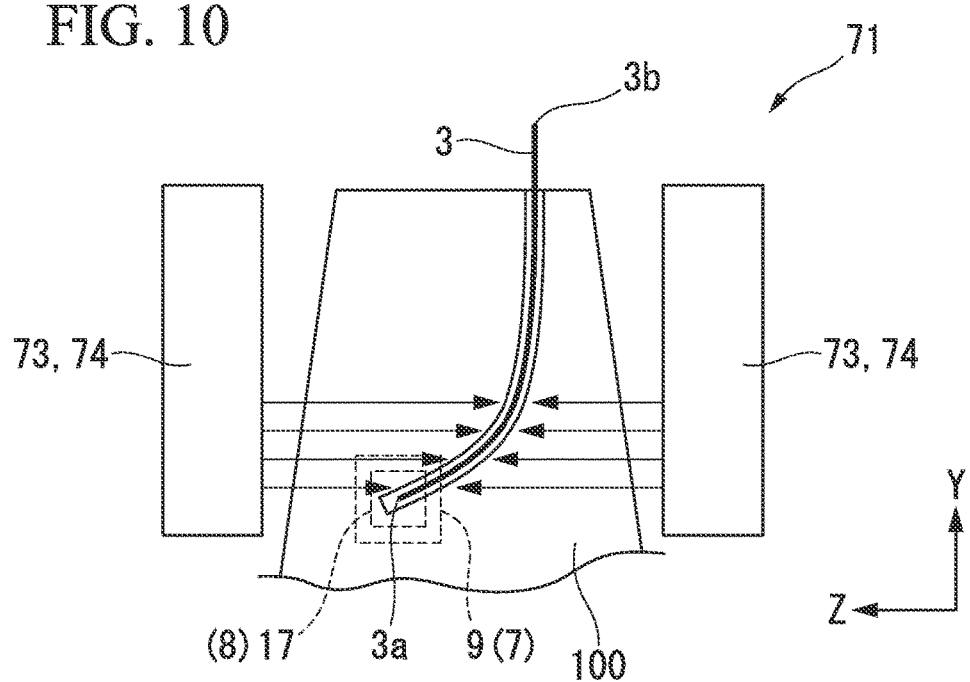
FIG. 10 is a schematic front view showing essential parts of an electrochemical machining apparatus according to a seventh embodiment of the present invention.

As shown in FIG. 10, the detecting unit 73 is a device for detecting the position of the electrode 3. For example, an X-ray machine using X-rays, a thermograph, a radiation inspection device, an ultrasonic flaw detecting unit, or a magnetic resonance imaging (MRI) scanner is used in the detecting unit 73. Further, a change in the magnetic field occurs, for instance, when the magnetic field is applied to the electrode 3. As such, the position of the electrode 3 may be detected by detecting the change of the magnetic field.

The position displacement controller 74 receives the input from the detecting unit 73, calculates a difference between the input value and a predetermined target machining value, and adjusts the magnetic field so as to reduce the difference.

According to the electrochemical machining apparatus 71, feedback control can be performed to approximate the machining hole 101 to a target machining position, by the detecting unit 73 and the position displacement controller 74, and a curved hole having a desired shape can be more reliably formed.

When the magnitude of the magnetic field is adjusted, a distance between the electrode 3 and a magnet 9 may be adjusted using the magnet movement mechanism 23 of the second embodiment. When the magnets 9 are electrodes, a magnitude of a voltage or current applied to the magnets 9 may be adjusted.

Further, the detecting unit 73 and the position displacement controller 74 of the present embodiment may be applied to the second to sixth embodiments.

Eighth Embodiment

Next, an electrochemical machining apparatus 81 according to an eighth embodiment of the present invention will be described.

Note that the same components as in the first to seventh embodiments will be given the same numerals or symbols, and detailed description thereof will be omitted.

In the present embodiment, the electrochemical machining apparatus 1 of the first embodiment is used as a basic constitution, and the electrochemical machining apparatus 81 further includes a deflection amount reducing mechanism 83 that reduces a deflection amount of an electrode 3 in a machining hole 101 during machining.

Figure 11:
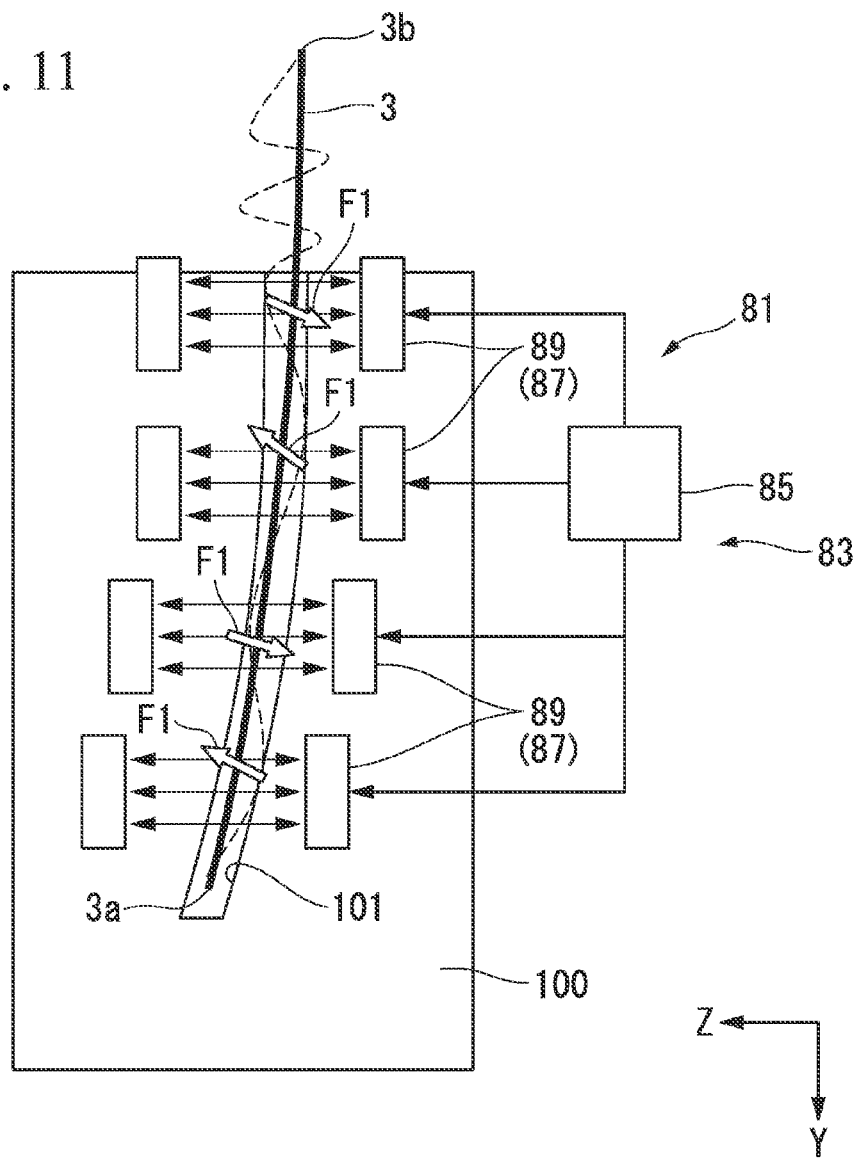
FIG. 11 is a schematic front view showing essential parts of an electrochemical machining apparatus according to an eighth embodiment of the present invention.

As shown in FIG. 11, the deflection amount reducing mechanism 83 has auxiliary magnetic field generation units 87 that apply a magnetic field to the electrode 3, and a deflection amount controller 85 that adjusts a magnitude of the magnetic field applied to the electrode 3 from the auxiliary magnetic field generation units 87.

The auxiliary magnetic field generation units 87 have the electrode 3, and a plurality of magnets 89 (four pairs of magnets 89 in the present embodiment) that are disposed in pairs so as to interpose the electrode 3 and a workpiece 100 into which the electrode 3 is inserted from opposite sides in a Z direction. The plurality of magnets 89 that form pairs are provided at intervals in a Y direction. Thus, the magnetic field is applied to the electrode 3 in the Z direction intersecting a direction in which the electrode 3 extends. Further, the magnets 89 may be electrodes or permanent magnets.

The magnets 89 that form pairs may be disposed to interpose the electrode 3 in an X direction, or to interpose the electrode 3 in the Z and X directions.

The deflection amount controller 85 previously calculates and stores the deflection amount of the electrode 3 which is generated by movement of the electrode 3 and adjusts intensity of the magnetic field applied to the electrode 3 from the magnets 89 of the auxiliary magnetic field generation units 87 so as to reduce the deflection amount. Here, the deflection amount of the electrode 3 can be calculated by regarding the electrode 3 as a cantilever beam that uses a base end 3b of the electrode 3 as a fulcrum. When the magnitude of the magnetic field is adjusted at the auxiliary magnetic field generation units 87, a distance between the electrode 3 and the magnet 89 may be adjusted using, for example, a mechanism such as the magnet movement mechanism 23 of the second embodiment. When the magnets 89 are electromagnets, a magnitude of a voltage or current applied to the magnets 89 may be adjusted.

Further, in the deflection amount controller 85, a method of applying the magnetic field so as to reduce the previously calculated deflection amount of the electrode 3 may be adapted to apply a predetermined magnetic field that is predetermined at each pair of magnets 89, may intermittently apply the magnetic field only to necessary magnets of the paired magnets 89 like a pulse wave, or may periodically apply the magnetic field using a sine wave.

According to this electrochemical machining apparatus 81, when the machining hole 101 of the workpiece 100 is machined as a curved hole while the electrode 3 moves toward the side of a distal end 3a, deflection may occur in the machining hole 101. In this case, smooth machinability of the machining hole 101 may be damaged. Here, the magnetic field can be applied to the electrode 3 from the auxiliary magnetic field generation units 87 so as to reduce the deflection occurring at the electrode 3 using the deflection amount reducing mechanism 83 and the electrode 3 can be bent by a Lorentz force F1. Therefore, the machining hole 101 can be easily machined as the curved hole.

With regard to the deflection amount of the electrode 3, in addition to the calculation of the beam, the device such as the detecting unit 73 described in the seventh embodiment may be applied. In detail, the position of the electrode 3 is detected using an X-ray machine, a thermograph, a radiation inspection device, an ultrasonic flaw defecting unit, or a magnetic resonance imaging (MRI) scanner, and the deflection amount can also be calculated from the detected value.

Further, in the auxiliary magnetic field generation units 87, the magnets 89 may not be provided in pairs. For example, the magnets 89 may be provided only at one side in the Z and X directions.

Further, the deflection amount reducing mechanism 83 of the present embodiment may be applied to the second to seventh embodiments.

Ninth Embodiment

Next, an electrochemical machining apparatus 91 according to a ninth embodiment of the present invention will be described.

Note that the same components as in the first to eighth embodiments will be given the same numerals or symbols, and detailed description thereof will be omitted.

In the present embodiment, the electrochemical machining apparatus 1 of the first embodiment is used as a basic constitution, and the electrochemical machining apparatus 91 further includes a deflection amount reducing mechanism 93 that is different from that of the eighth embodiment.

Figure 12:
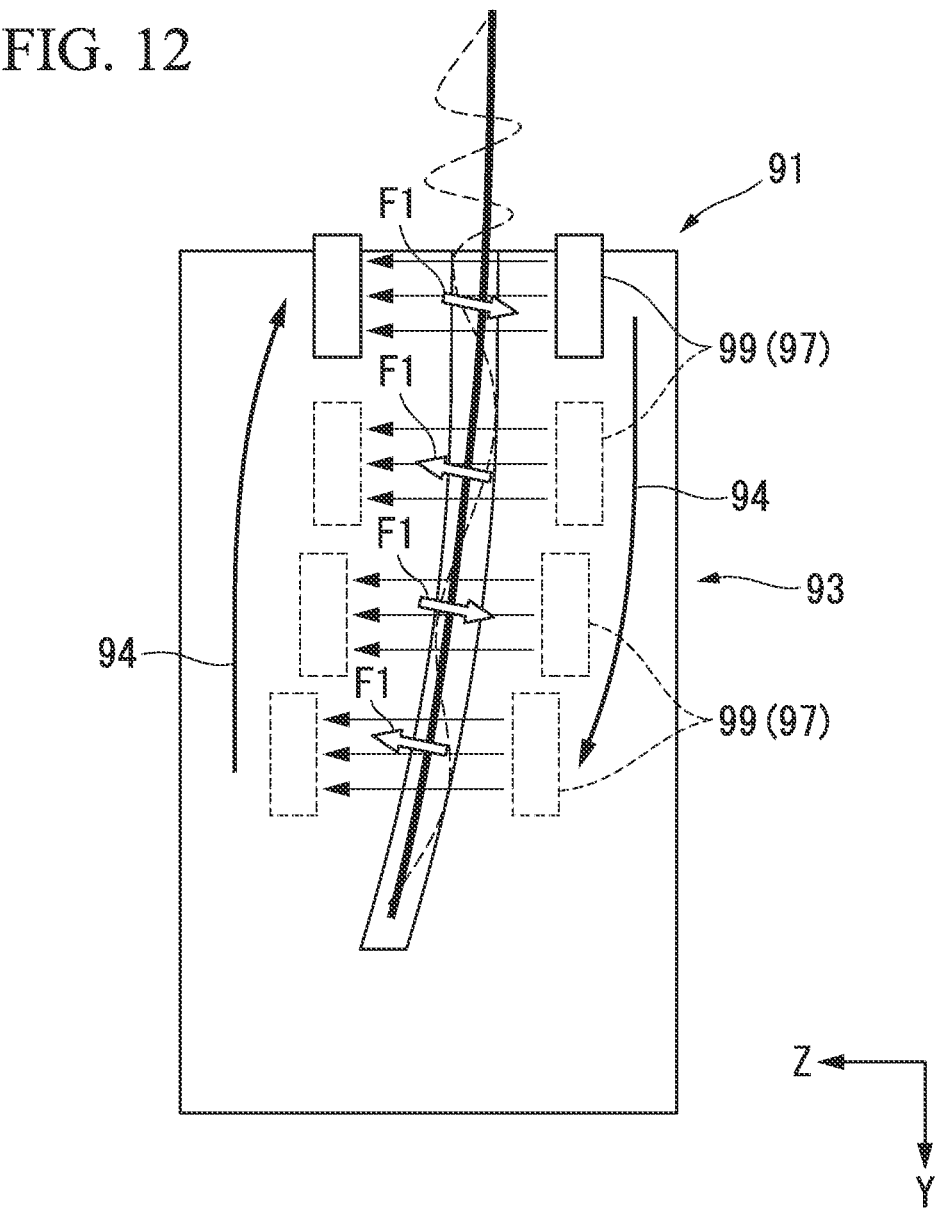
FIG. 12 is a schematic front view showing essential parts of an electrochemical machining apparatus according to a ninth embodiment of the present invention.

As shown in FIG. 12, the deflection amount reducing mechanism 93 has at auxiliary magnetic field generation unit 97 that applies a magnetic field to an electrode 3, and a reciprocating mechanism 94 that allows the auxiliary magnetic field generation unit 97 to reciprocate in a Y direction that is a direction in which the electrode 3 extends.

The auxiliary magnetic field generation unit 97 has the electrode 3, and a pair of magnets 99 so as to interpose the workpiece 100 into which the electrode 3 is inserted from opposite sides in a Z direction. Then, the magnetic field is applied to the electrode 3 in the Z direction intersecting the direction in which the electrode 3 extends. Further, the magnets 99 may be electromagnets or permanent magnets.

The pair of magnets 99 may be disposed to interpose the electrode 3 in an X direction, or to interpose the electrode 3 in the Z and X directions.

The reciprocating mechanism 94 causes the pair of magnets 99 to reciprocate in the Y direction. Although details of the reciprocating mechanism 94 are not shown, the reciprocating mechanism 94 moves the magnets 99 using, for instance, a motor or an actuator. Further, in the present embodiment, the magnets 99 reciprocate between a magnetic field generation unit 97 disposed at a distal end 3a of the electrode 3 and a base end 3b of the electrode 3.

According to this electrochemical machining apparatus 91, when a curved hole is machined in the workpiece 100, and when the electrode 3 is flexed, the magnetic field is applied by the pair of magnets 99 of the auxiliary magnetic field generation unit 97 while the magnets reciprocate the direction in which the electrode 3 extends. Thereby, the electrode 3 can be bent by a Lorentz force F1. Therefore, it is possible to cause the electrode 3 to be pulled to reduce the amount of deflection, and to more easily machine the machining hole 101 as the curved hole.

With regard to the amount of deflection of the electrode 3, similar to the eighth embodiment, in addition to the calculation of the beam, a device such as the detecting unit 73 described in the seventh embodiment may be applied.

Further, in the auxiliary magnetic field generation units 97, the magnets 99 may not be provided in pairs. For example, the magnets 89 may be provided only at one side in the Z and X directions.

Further, the deflection amount reducing mechanism 93 of the present embodiment may be applied to the second to seventh embodiments.

While the embodiments of the present invention have been described, slight changes in design are also possible without departing from the technical spirit of the present invention.

For example, in the aforementioned embodiments, a current controller for controlling the magnitude of the electric current flowing from the current supply unit 6 to the electrode 3 may be further provided. Thus, when the electric current is increased by such a current controller, the magnitude of the Lorentz force F acting on the charged particles in the electric current flowing to the electrode 3 can be increased. In contrast, when the electric current is reduced, the Lorentz force F can be reduced. Thereby, a bending force acting on the electrode 3 can thus be controlled, and the machining hole 101 can be machined into a desired curved hole.

When the electric current of the electrode 3 is increased in this way, an electrolysis amount per unit time is increased, and thus a diameter of the machining hole 101 is increased. However, the diameter can be prevented from being increased, for example, by increasing a movement speed of the electrode 3.

Further, in the aforementioned embodiments, since the magnetic field is applied to the electrode 3 by the magnetic field generation unit 7 (57, 67), the guide unit 5 for guiding the electrode 3 during the machining is not necessarily provided.

INDUSTRIAL APPLICABILITY

According to the foregoing electrochemical machining apparatus, it is possible to bend the electrode using the Lorentz force acting on the charged particles in the electric current due to the magnetic field generation unit, and to easily form the curved hole having a desired shape.

REFERENCE SIGNS LIST

1: electrochemical machining apparatus
3: electrode
3a: distal end
3b: base end
4: movement mechanism
4a: gripper
5: guide unit
5a: guide hole
6: current supply unit
6a: cable
7: magnetic field generation unit
8: support member
9: magnet
11: stage
12: support shaft
13: support arm
14: support shaft movement mechanism (first movement mechanism)
15: support arm movement mechanism (first movement mechanism)
17: magnet support
18: arm
19: arm connector
O: axis
W: electrolyte
21: electrochemical machining apparatus
23: magnet movement mechanism (second movement mechanism)
28: support member
29: arm connector
31: electrochemical machining apparatus
33: rotating mechanism
41: electrochemical machining apparatus
43: ring guide
44: ring guide support
44a: guide roller
44b: holder
45: hoisting accessory
46: hoisting accessory movement mechanism (first movement mechanism)
47: rotating mechanism
48: support member
O1: axis
51: electrochemical machining apparatus
53: magnetic field controller
56: support member movement mechanism (first movement mechanism)
57: magnetic field generation unit
58: support member
O2: axis
61: electrochemical machining apparatus
67: magnetic field generation unit
71: electrochemical machining apparatus
73: detecting unit
74: position displacement controller
81: electrochemical machining apparatus
83: deflection amount reducing mechanism
85: deflection amount controller
87: auxiliary magnetic held generation unit
89: magnet
91: electrochemical machining apparatus
93: deflection amount reducing mechanism
94: reciprocating mechanism
97: auxiliary magnetic field generation unit
99: magnet
100: workpiece
100a: distal end
101: machining hole

The invention claimed is:

1. An electrochemical machining apparatus comprising:
an electrode configured to form of a shape which a tube shape is extended, configured of a flexible conductive material, and in which an electrolyte circulates from a base end side thereof toward a distal end side thereof;

a current supply unit configured to cause electric current to flow with respect to the electrode in an extending direction in which the electrode extends;

a magnetic field generation unit comprising at least one pair of magnets disposed to face each other and configured to apply a magnetic field with respect to the electrode in a direction intersecting the extending direction; and a first movement mechanism comprising:
- a support arm movement mechanism that moveably supports the magnetic field generation unit in a direction which is perpendicular to a facing direction of the pair of magnets and along the extending direction of the electrode, and
- a support shaft movement mechanism that moveably supports the magnetic field generation unit in a direction which is perpendicular to the facing direction of the pair of magnets and is perpendicular to the extending direction of the electrode.

2. The electrochemical machining apparatus according to claim 1, further comprising a rotating mechanism configured to move the magnetic field generation unit to be rotated about an axis extending in a direction intersecting facing directions of the pair of magnets.

3. The electrochemical machining apparatus according to claim 2, further comprising a support member configured to support the pair of magnets in the magnetic field generation unit and comprises a ring guide formed in an annular shape about the axis.

4. The electrochemical machining apparatus according to claim 1, wherein:
the magnetic field generation unit is configured such that the plurality of pairs of magnets which are disposed to interpose the electrode are arranged in an annular shape so as to surround the electrode;
wherein the pair of magnets are electromagnets; and
wherein the magnetic field generation unit comprises a magnetic field controller that controls a magnitude of the magnetic field generated by each pair of magnets.

5. The electrochemical machining apparatus according to claim 1, further comprising a second movement mechanism configured to move toward and away the pair of magnets of the magnetic field generation unit each other.

6. The electrochemical machining apparatus according to claim 1, further comprising a current controller configured to control a magnitude of the electric current flowed by the current supply unit to the electrode.

7. The electrochemical machining apparatus according to claim 1, wherein:
a plurality of the electrodes are disposed at predetermined intervals in the direction intersecting the extending direction of the electrode; and
the magnetic field generation unit is disposed so as to apply the magnetic field at different positions in the extending direction with respect to each of the plurality of electrodes.

8. The electrochemical machining apparatus according to claim 1, further comprising:
a detecting unit configured to detect a position of the electrode; and
a position displacement controller configured to calculate a difference between the position of the electrode detected by the detecting unit and a predetermined target machining position and to adjust magnitude of the magnetic field so as to reduce the calculated difference.

9. The electrochemical machining apparatus according to claim 1, further comprising a deflection amount reducing mechanism,
wherein the deflection amount reducing mechanism comprises auxiliary magnetic field generation unit configured to apply the magnetic field in a direction intersecting the extending direction with respect to the electrode and a deflection amount controller configured to calculate a deflection amount of the electrode and to adjust magnitude of the magnetic field applied by the auxiliary magnetic field generation unit so as to reduce the calculated deflection amount.

10. The electrochemical machining apparatus according to claim 1, further comprising a deflection amount reducing mechanism, wherein the deflection amount reducing mechanism comprises an auxiliary magnetic field generation unit configured to apply the magnetic field in a direction intersecting the extending direction with respect to the electrode and a reciprocating mechanism configured to cause the auxiliary magnetic field generation unit to reciprocate in the extending direction of the electrodes.

* * * * *